(12) United States Patent
Matheis

(10) Patent No.: US 11,491,596 B2
(45) Date of Patent: Nov. 8, 2022

(54) POWER TOOL AND METHOD FOR OPERATING A POWER TOOL

(71) Applicant: Metabowerke GmbH, Nuertingen (DE)

(72) Inventor: Frank Matheis, Reichenbach (DE)

(73) Assignee: Metabowerke GmbH, Nuertingen (DE)

( * ) Notice: Subject to any disclaimer, the term of this patent is extended or adjusted under 35 U.S.C. 154(b) by 914 days.

(21) Appl. No.: 16/184,406

(22) Filed: Nov. 8, 2018

(65) Prior Publication Data

US 2019/0210172 A1 Jul. 11, 2019

(30) Foreign Application Priority Data

Nov. 9, 2017 (DE) ...................... 10 2017 126 186.9

(51) Int. Cl.
| | |
|---|---|
| *B23Q 5/58* | (2006.01) |
| *H02P 29/032* | (2016.01) |
| *H02P 29/10* | (2016.01) |
| *B23Q 5/10* | (2006.01) |
| *H02P 29/024* | (2016.01) |

(52) U.S. Cl.
CPC ................. *B23Q 5/58* (2013.01); *B23Q 5/10* (2013.01); *H02P 29/026* (2013.01); *H02P 29/032* (2016.02); *H02P 29/10* (2016.02)

(58) Field of Classification Search
CPC ....... H02P 29/026; H02P 29/032; H02P 29/10
USPC ............................... 318/490, 3, 34
See application file for complete search history.

(56) References Cited

U.S. PATENT DOCUMENTS

| | | | |
|---|---|---|---|
| 8,847,532 B2 * | 9/2014 | Miyazaki ................. | B25F 5/00 318/560 |
| 9,406,915 B2 * | 8/2016 | White ................. | H01M 50/502 |
| 2012/0079799 A1 | 4/2012 | Matsunaga et al. | |

FOREIGN PATENT DOCUMENTS

| | | |
|---|---|---|
| DE | 19742916 A1 | 4/1999 |
| DE | 69614995 T2 | 4/2002 |
| DE | 102009059884 A1 | 6/2011 |
| DE | 102013220727 A1 | 4/2015 |
| DE | 102015001394 A1 | 8/2015 |
| DE | 102014105107 A1 | 10/2015 |

(Continued)

OTHER PUBLICATIONS

Deutshes Patent—Und Markenamt, "Search Report Regarding Application No. 102017126186.9", dated Aug. 3, 2018, p. 12, Published in: DE.

(Continued)

*Primary Examiner* — David Luo
(74) *Attorney, Agent, or Firm* — Neugeboren O'Dowd PC

(57) ABSTRACT

The invention relates to an electric machine tool comprising an electric motor, a motor control unit for operating the electric motor, an input interface for entering a target specification of an operating mode of the electric motor into the motor control unit, and a motor sensor device for detecting the operating mode of the electric motor. A slave control unit is provided, which is independent from the motor control unit and communicatingly connected to the motor sensor device and the input interface and designed to compare the operating mode of the electric motor detected by the motor sensor device with the target specification entered via the input interface, and to influence the operating mode of the electric motor in case of a defined deviation of the operating mode from the target specification by means of a control device.

13 Claims, 1 Drawing Sheet

(56) References Cited

FOREIGN PATENT DOCUMENTS

| DE | 102015118560 A1 | 5/2016 |
|---|---|---|
| DE | 102015103650 A1 | 9/2016 |
| EP | 2923654 A1 | 9/2015 |
| EP | 3299127 A1 | 3/2018 |
| WO | 2011085882 A1 | 7/2011 |

OTHER PUBLICATIONS

Bonnin, David, "Search Report Regarding European Patent Application No. 18205200", dated May 4, 2019, p. 9, Published in: EP.
Office Action received for European Patent Application Serial No. 18205200.1 dated Jan. 12, 2022, 7 pages.
"Electric Motor-operated Hand-held Tools, Transportable Tools and Lawn and Garden Machinery-Safety—Part 1: General Requirements", IEC 62841-1, International Standard, Edition 1.0, 352 pages, Mar. 2014.
Heinzelmann et al., "Energy Efficient Drive Train for a High-Performance Battery Chain Saw", IEEE, pp. 101-106, 2011.

\* cited by examiner

POWER TOOL AND METHOD FOR OPERATING A POWER TOOL

FIELD OF THE INVENTION

The invention relates to an electric machine tool, comprising an electric motor according to the preamble of claim 1.

The invention also relates to a method for operating an electric machine tool having an electric motor according to the preamble of claim 9.

The invention further relates to a computer program product.

BACKGROUND OF THE INVENTION

Electric machine tools for processing and manufacturing workpieces are well-known in the prior art. Electric machine tools of the type in question can be found, for example, in DE 10 2014 105 107 A1, which essentially relates to a hand-held machine tool, for example, an angle or straight grinder, or in DE 10 2015 103 650 A1, which essentially relates to a hand-held machine tool for drilling or screwing.

The known electric machine tools comprise an electric motor for executing mostly rotating, but partly also translational movements, and a input interface, usually in the design of an operating switch, with which the electric motor can be operated via a motor control unit.

Experience has shown that electric machine tools are subject to high mechanical loads, particularly during the use at construction sites, and are sometimes operated carelessly. Even with robust electric machine tools, this can result in mechanical and/or electric failures of the electric machine tools, and a proper operation can thus no longer be ensured. In addition to a simple failure of the electric machine tool, which is inconvenient for the operator but usually not dangerous, it must be ensured that a partial failure of the mechanical and/or electronic system does not result in dangerous operating conditions, such as an uncontrollable operation of the electric motor.

Corresponding protective measures are governed by standards. For example, the directive "Performance Level C" described in EN ISO 13849/1 stipulates a two-channel system for monitoring the electronic system in electric machine tools. It must be particularly ensured that the electric machine tool or the electric motor of the electric machine tool is effectively deactivated, when the operating switch is released.

For reaching the Performance Level C directive, it is known to provide circuits with a circuit breaker, which can be used as an operating switch, or with a separate electronic circuit breaker. They reliably open the electric circuit to the electric motor, when the operating switch is released, and the electric motor is safely deactivated.

However, the use of circuit breakers involves a number of disadvantages. In addition to the high economic costs of the circuit breakers, high electric losses occur during the operation of the electric machine tool which, among others, lowers the maximum operating time of a battery-powered electric machine tool and leads to unwanted heat loss.

From the prior art, a method for operating a line-operated electric motor for an electric tool, using switches, particularly semiconductor switches, is further known from DE 10 2009 059 884 A1, wherein the operation of the switches is monitored by means of an electronic control.

Lastly, DE 10 2013 220 727 A1 describes a control device with a safety unit which is designed to generate safety control signals. A driver unit of the control device is designed, irrespective of a state of motor control signals, to generate power semiconductor control signals for a first state pattern of the safety control signals in such a manner that power semiconductors have a non-conductive state, to generate the power semiconductor control signals for a second state pattern of the safety control signals in such a manner that a bridge output connection is electrically connected to a positive intermediate circuit potential, and to generate the power semiconductor control signals for a third state pattern of the safety control signals in such a manner that the bridge output connection is electrically connected to a negative intermediate circuit potential.

SUMMARY OF THE INVENTION

The present invention addresses the problem of providing an improved electric machine tool and an improved method for operating an electric machine tool, particularly, to ensure a high safety standard for the operation of the electric machine tool, wherein known disadvantages of the prior art are at least reduced.

The problem is solved by an electric machine tool according to claim 1 and a method according to claim 9.

Lastly, the invention also addresses the problem of providing a computer program product with program code means in order to provide, with respect to the prior art, an improved method for operating an electric machine tool.

This problem is solved by a computer program product according to claim 13.

The dependent claims relate to advantageous embodiments and variations of the invention.

DETAILED DESCRIPTION OF THE PREFERRED EMBODIMENTS

Figure 1:
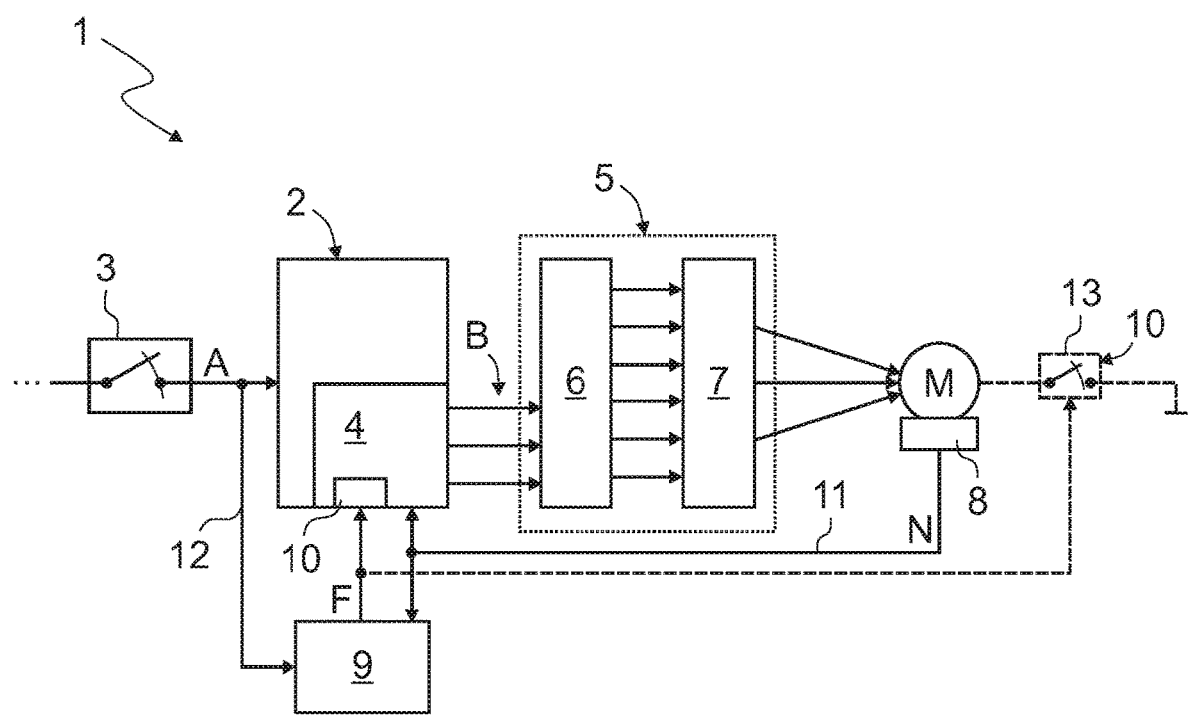
FIG. 1 is a schematic drawing of an electric machine tool in accordance with aspects of the invention.

An electric machine tool is provided which comprises an electric motor, a motor control unit for operating the electric motor, an input interface for entering a target specification of an operating mode of the electric motor into the motor control unit, and a motor sensor device for detecting the operating mode of the electric motor.

In the following, electric machine tools shall refer to both hand-held electric machine tools, such as drills, angle grinders, or the like, and devices that are stationary or semi-stationary during operation, such as table saws or the like.

The invention is suitable for the use of an electric machine tool with an electric motor of any design, for example, a three-phase motor, an AC motor, a DC motor, a universal motor, a linear motor, etc. However, the invention is particularly suitable for the use with a brushless DC motor.

According to the invention, the electric machine tool comprises a slave control unit which is independent from the motor control unit and communicatingly connected to the motor sensor device and the input interface and designed to compare the operating mode of the electric motor detected by the motor sensor device with the target specification entered via the input interface, and to influence the operating mode of the electric motor in case of a defined deviation of the operating mode from the target specification by means of a control device.

When the target specification for an operating mode is thus entered into the motor control unit via the input interface, this information or target specification can also be available for the independent control unit.

It can be provided that the motor sensor device used by the slave control unit for monitoring the electric motor is simultaneously used by the motor control unit for operating the electric motor (e.g. as a measuring element within a control circuit). An existing electric machine tool can thus be easily expanded by adding an independent slave control unit without significantly changing the existing electronic system, e.g., by adding further sensors.

By means of the slave control unit, which is independent from the motor control unit, a two-channel system can be provided in an advantageous manner without a circuit breaker being stringently required. In case of an error during the control of the electric motor, e.g., in case of an error in the motor control unit, as a result of which a target specification (particularly a deactivation request) is not detected via the input interface, a redundant monitoring of the input interface and the electric motor can be ensured by the separate slave control unit. In case of an error or a detected defined deviation of the operating mode from the target specification, the electric motor can be influenced by means of the control device; if necessary, the entire electric machine tool can be safely deactivated.

In a particular development of the invention, the slave control unit and/or the control device can be designed to deactivate the electric motor in case of a defined deviation of the target specification from the operating mode, or to influence the electric motor such that it reaches the target specification.

The control device can be designed as an independent open-loop and/or closed-loop control device in order to influence the operating mode of the electric motor. However, an existing open-loop and/or closed-loop control device can also be useable as a control device according to the invention.

In particular, a redundant control and/or deactivation path can be ensured by the control device.

The invention is basically suitable for ensuring compliance with any target specifications during the operation of the electric motor and is not limited to the use as redundant deactivation path. For example, with the comparison of the entered target specification with the detected operating mode of the electric motor, it is also possible to monitor a safe activation and/or the safe compliance with any speed specification. In case of a detected deviation from the specification, the slave control unit can subsequently purposefully influence the electric motor by means of the control device (e.g., activate or adjust it to the predefined speed), or, when in doubt, also safely deactivate or switch it to a (decelerated) emergency mode.

Due to the fact that the use of a circuit breaker, for example, a separate electronic semiconductor switch (e.g. MOSFET or bipolar transistor) is not necessarily required, the electric machine tool, according to the invention, can be operated at low loss. Furthermore, the slave control unit can be realizable more cost-efficiently than a circuit breaker. Lastly, the option of a controlled deceleration and/or a controlled start-up process or any other speed-time curve by the motor control unit during normal operation is also technically possible in a simplified manner.

Since a particularly energy-efficient operation is possible with the electric machine tool according to the invention, the invention is suitable particularly (but not exclusively) for the use with electric machine tools which are operated independently from the power grid, and particularly for the use with electric tool devices with a power supply from one or more rechargeable battery packs. However, the present invention can basically also be used for line-powered (e.g. 230 volts AC) electric machine tools.

In a development of the invention, the input interface can be designed as a user interface, preferably as an operating switch or as a pushbutton.

In particular, the input interface can be the operating switch of the electric machine tool. The invention is particularly suitable in connection with a currentless microswitch as operating switch of the electric machine tool.

However, the input interface can also be realized as a data interface, machine interface, hardware interface, or any other interface. For example, the target specification for an operating mode of the electric motor can also be predetermined by a further control unit of the electric machine tool or even by an independent electric device. Therefore, the invention can, for example, also be used for electric machine tools that are remote-controlled or time-controlled. In these cases, particularly a safe stopping or deactivation of the electric motor in case of an error must also be ensured.

In a development of the invention, it can be provided that the motor sensor device comprises a power measuring unit, a speed sensor and/or a vibration sensor.

A power measuring unit refers particularly to a power meter for detecting the electric power of the electric motor. However, alternatively, a voltmeter and/or an ammeter can also be provided. In principle, any motor sensor device, which can contribute to the detection of the operating mode of the electric motor, can be provided. For example, by means of a vibration sensor, an active or inactive operating mode of the electric motor can be indicated.

The use of a speed sensor as a motor sensor device has proven to be particularly suitable in order to detect the actual operating mode of the electric motor as precisely and simply as possible.

In a development, it can be provided that the speed sensor is designed as Hall sensor, reed sensor, optical sensor and/or capacitive proximity sensor.

Particularly speed sensors designed as Hall sensors can be usable meaningfully and cost-efficiently for detecting the speed of electric motors in electric machine tools. Therefore, an already existing Hall sensor can be used as motor sensor device for monitoring the operating mode of the electric motor by the independent slave control unit.

In a development of the invention, it can be provided that the control device comprises a computer program product with program code means of the safety class B ("software class B input") which is executed within the motor control unit, a circuit breaker within a power path to the electric motor and/or an electric fuse of the electric machine tool.

For example, it can be provided that, in case of a detected defined deviation of the operating mode from the target specification, the slave control unit generates an error signal which is transmitted to the control device and causes a deactivation of the electric motor by the control device. If a correspondingly protected or redundant deactivation path is already present in the motor control unit, for example, in the form of a software class B input, the error signal for deactivating the electric motor can be transmitted directly from the slave control unit to the motor control unit.

Alternatively or additionally, the error signal of the slave control unit can be provided for the control of a circuit breaker, particularly an electronic semiconductor switch, within the power path to the electric motor.

It is also possible to achieve a deactivation of the electric motor by deactivating the electric machine tool itself. This can be achieved, for example, by interrupting the energy supply of the electric machine tool, for example, by the slave control unit activating a fuse of the electric machine tool.

It can also be provided that the slave control unit, particularly by transmitting an error signal, activates a safety function of a connected energy source. For example, battery packs frequently comprise internal battery management systems (BMS) and error interfaces. It can thus be provided that the slave control unit transmits an error signal via the error interface of the electric machine tool to a battery management system of a connected battery pack, whereupon the battery pack discontinues the energy supply. In a similar manner, an external (fault-current) circuit breaker could be triggered in case of a line-powered electric machine tool by the deliberate imprinting of a fault current by a fault circuit controlled by the slave control unit in order to interrupt the power supply of the electric machine tool.

In a development of the invention, it can also be provided that, for operating the electric motor, the motor control unit comprises a pulse width modulation unit for generating a pulse width modulation signal for a power control of the electric motor.

In case of a defined deviation of the operating mode from the target specification, the slave control unit can, for example, subsequently deactivate the pulse width modulation signals of the pulse width modulation unit by transmitting an error signal to the pulse width modulation unit, upon which the electric motor is also deactivated. It can also be provided that the slave control unit influences the pulse width modulation signals or replaces them with its own signals in order to influence the electric motor and to reach the target specification.

In a development, it can further be provided that, for operating the electric motor, the motor control unit is connected to the electric motor by means of a power amplifier or a motor driver.

In particular, a multi-stage power amplifier can be provided.

In case of a defined deviation of the operating mode from the target specification, the slave control unit can, for example, by transmitting an error signal, deactivate the power amplifier or any stage of the power amplifier (e.g. a preliminary stage or a final stage) in order to achieve a deactivation of the electric motor.

The motor control unit can be implemented within a main controller of the electric machine tool or be contained in or designed as the main controller. Preferably, the slave control unit is designed as a second controller.

The invention also relates to a method for operating an electric machine tool with an electric motor, according to which an input interface for entering a target specification of an operating mode of the electric motor is used in a motor control unit which operates the electric motor, wherein a motor sensor device detects the operating mode of the electric motor.

The method according to the invention provides that a slave control unit, which is independent from the motor control unit, monitors the operating mode of the electric motor by means of the motor sensor device and compares it to the target specification entered by the input interface, wherein the slave control unit deactivates the electric motor in case of a defined deviation of the operating mode from the target specification, or influences it to reach the target specification.

The electric motor can be influenced and/or deactivated by the independent slave control unit directly or indirectly using a control device.

It must basically be noted that features already described in connection with the electric machine tool according to the invention are, of course, also implementable advantageously in the method according to the invention or the computer program product described in the following—and vice versa. In addition, advantages already described in connection with the electric machine tool according to the invention can also be understood to apply to the method or the computer program product according to the invention—and vice versa.

In a development, it can be provided that discreet operating modes of the electric motor, particularly an activated/deactivated operating mode of the electric motor and/or continuous operating modes, particularly a speed or an electric power consumption of the electric motor, are used as target specification.

The invention is particularly suitable for the use with target specifications regarding the two operating modes "activated"/"deactivated." When a user of the electric machine tool, for example, releases the operating switch of the electric machine tool, the electric motor is usually supposed to be deactivated in a timely manner. If the motor sensor device subsequently detects that this target specification is not met, the slave control unit can be used as a redundant safety system to deactivate the electric motor.

In a development, it can be provided that, in case of a target specification regarding a deactivated operating mode of the electric motor, a defined deviation of the operating mode from the target specification is present, when the electric motor is not deactivated within a defined interval after the input of the target specification and/or when no defined drop of the speed and/or no defined drop of the power consumption of the electric motor occurs within the defined interval.

A deviation between target specification and operating mode of the electric motor, which lies within measurement, operating, or other tolerances to be expected is not the defined deviation according to the invention.

It is further provided that, prior to the comparison of an immediately entered target specification with the current operating mode of the electric motor, a defined interval elapses in order to ensure that it was possible for the respective components (e.g. the motor control unit) to sufficiently process and implement the target specification during the regular operation of the electric machine tool at least to the extent that it is possible to detect a reaction in the electric motor during normal operation (e.g., a drop of the speed in case of a deactivation request).

Particularly during monitoring with regard to a deactivated operating mode, a safe deactivation path and thus a particularly safe electric machine tool can be provided. For example, if a user releases the operating switch of the electric machine tool and the speed of the motor (or the power consumption of the electric motor) continues to remain constant, drops only unexpectedly slowly, or even increases, the slave control unit can detect this as an error due to a defined deviation of the operating mode from the target specification. In case of an open operating switch, it is to be expected that the speed of the electric motor decreases over time in a defined manner. If this is not the case, the slave control unit, if necessary, can block the control of the electric motor, upon which the electric motor can safely come to a stop.

In a development of the invention, it can be provided that, in case of a deactivation of the electric motor due to a defined deviation of the operating mode from the target specification, a restart of the electric motor (or the entire electric machine tool) is prevented.

For example, an already existing restart protection is activated by the slave control unit and/or the electric machine tool can be blocked until activation by the manufacturer or customer service. It can thus be ensured that a user does not continue to negligently use an electric machine tool which has been detected as faulty.

The invention also relates to a computer program product with program code means in order to execute an aforementioned method, when the program is executed in a control unit of an electric machine tool.

The control unit, particularly the motor control unit and/or the slave control unit can be designed as microprocessors. Instead of a microprocessor, any further device for implementing the control unit or motor control unit and/or slave control unit can be provided, for example, one or more arrangements of discreet electric components on a circuit board, a programmable logic controller (PLC), or any other programmable circuit, for example, also a field-programmable gate array (FPGA), a programmable logic arrangement (PLA) and/or a commercially available computer.

Additionally, it must be noted that terms, such as "comprising," "having," or "with" do not exclude any other features or steps. Furthermore, terms, such as "one" or "the," which refer to singular steps or features, exclude a plurality of features or steps.

In the following, an embodiment of the invention is described in more detail using the drawing.

The drawing shows a preferred embodiment, in which individual features of the present invention are depicted in combination with one another. However, the features are also realizable in isolation and can correspondingly be readily connected to further meaningful combinations and sub-combinations by a person skilled in the art.

The electric machine tool 1 shown in the drawing comprises an electric motor M and a motor control unit 2 for operating the electric motor M.

Furthermore, an input interface is provided which, in the embodiment, is designed as a user interface and realized as an operating switch 3 (or a pushbutton). In principle, however, any input interface can be provided, for example, also a pure data interface. By means of the operating switch 3, a target specification A of an operating mode of the electric motor M can be entered into the motor control unit 2. In the embodiment, the target specification A are the discreet operating modes "activated" and "deactivated" of the electric motor M. By means of the operating switch 3, the electric motor M of the electric machine tool 1 can optionally thus be activated or deactivated. In principle, any discreet operating mode and/or any continuous operating mode, particularly also a speed N or an electric power consumption of the electric motor M can be used as target specification A.

For operating the electric motor M, the motor control unit 2 in the embodiment comprises a pulse width modulation unit 4 for generating a pulse width modulation signal B for a power control of the electric motor M. However, the pulse width modulation unit 4 can also be omitted and replaced by a different unit for the power control. In terms of the invention, this is not relevant.

Lastly, the motor control unit 2 drives the electric motor M in the embodiment by means of a power amplifier 5, wherein the pulse width modulation signal B for controlling the electric motor M is amplified correspondingly. The embodiment shows a two-stage power amplifier 5, consisting of a driver or preliminary stage 6 and a final stage 7. Basically, the power amplifier 5 can have any design, for example, it can also be designed as a single-stage amplifier or even be omitted; in terms of the invention, this is also not relevant.

The electric machine tool 1 further comprises a motor sensor device 8 for detecting the operating mode of the electric motor M. The output signal of the motor sensor device 8 (in the present embodiment, for example, the speed N of the electric motor M) is fed back to the motor control device 2 in order to ensure a suitable power control. However, the feedback can also be omitted.

The motor sensor device 8 can comprise a power measuring unit for detecting the electric power consumption of the electric motor M, an ammeter, a voltmeter, a speed sensor and/or a vibration sensor. The use of a speed sensor as motor sensor device 8 has proven particularly suitable, wherein the speed sensor can be designed as Hall sensor, reed sensor, optical sensor and/or capacitive proximity sensor.

For the compliance with statutory standards and for providing a particularly safe electric machine tool 1, a second channel is provided according to the invention which comprises a slave control unit 9 which is independent from the motor control unit 2. The slave control unit 9 is communicatingly connected to the motor sensor device 8 for monitoring the operating mode of the electric motor M, and to the input interface or the operating switch 3 and designed to compare the operating mode of the electric motor M with the target specification A entered via the input interface or the operating switch 3, and in case of a defined deviation of the operating mode from the target specification A, influence, particularly deactivate or otherwise influence, the electric motor M by means of a control device 10, for example, such that the target specification A is reached.

In the embodiment, the motor sensor device 8, which is already present for controlling the electric motor M, is also used by the slave control device 9. A corresponding sensor signal, which in the embodiment contains the speed N of the electric motor M, can be connected, for example, via a corresponding sensor signal line 11 to both the motor control unit 2 and the slave control unit 9.

Furthermore, the input interface or the operating switch 3 is connected via a sensor signal line 12 to both the motor control unit 2 and the slave control unit 9. It is thus possible that the slave control unit 9, which is independent from the motor control unit 2, monitors the operating mode of the electric motor M by means of the motor sensor device 8 and compares said operating mode with the target specification A entered by the input interface or the operating switch 3, wherein the slave control unit 9, in case of a defined deviation of the operating mode from the target specification A, deactivates the electric motor M.

In particular, in case of a target specification A regarding a deactivated operating mode of the electric motor M, a defined deviation of the operating mode from the target specification A can be present, when the electric motor M is not deactivated after a defined interval following the entry of the target specification A. A defined deviation of the operating mode from the target specification A can also be present, when no defined drop of the speed N and/or no defined drop of the power consumption of the electric motor M occurs within the defined interval.

In the embodiment, a computer program product with program code means of the safety class B executed within the motor control unit 2 is provided as control device 10. In case of a detected deviation, the slave control unit 9 can thus transmit an error signal F to the motor control unit 2, whereupon, for example, the pulse width modulation unit 4 is deactivated.

Alternatively or additionally, a circuit breaker 13 can also be provided within a power path to the electric motor M, for example, for interrupting a ground line or any other electric line to the electric motor M, in that the error signal F deactivates the output of the circuit breaker 13. In the drawing, the principle is shown dashed. Lastly, the electric fuse (not depicted) can also be used for deactivating the electric motor M or the entire electric machine tool 1. A transmission of the error signal F to the energy source (battery pack and/or power supply) supplying the electric machine tool 1 is possible.

It can be provided that, in case of a deactivation of the electric motor M due to a defined deviation of the operating mode from the target specification A, a restart of the electric motor M or the electric machine tool 1 is prevented.

The motor control unit 2 and/or the slave control unit 9 can be designed as microprocessors and/or comprise one or more arrangements of discreet electric components on a circuit board. Basically, any designs of the control units 2, 9 are possible.

The invention claimed is:

1. An electric machine tool (1) comprising an electric motor (M), a motor control unit (2) for operating the electric motor (M), an input interface (3) for entering a target specification (A) of an operating mode of the electric motor (M) into the motor control unit (2), and a motor sensor device (8) for detecting the operating mode of the electric motor (M),
   characterized in that
   a slave control unit (9) is provided, which is independent from the motor control unit (2) and connected to the motor sensor device (8) and the input interface (3) and designed to compare the operating mode of the electric motor (M) detected by the motor sensor device (8) with the target specification (A) entered via the input interface (3), and to influence the operating mode of the electric motor (M) in case of a defined deviation of the operating mode from the target specification (A) by means of a control device (10).

2. The electric machine tool (1) according to claim 1, characterized in that
   the slave control unit (9) and/or the control device (10) is/are designed to deactivate the electric motor (M) in case of a defined deviation of the target specification (A) from the operating mode, or to influence the electric motor (M) such that it reaches the target specification (A).

3. The electric machine tool (1) according to claim 1, characterized in that
   the input interface is designed as a user interface, preferably as an operating switch (3) or as a pushbutton.

4. The electric machine tool (1) according to claim 1, characterized in that
   the motor sensor device (8) comprises a power measuring unit, a speed sensor and/or a vibration sensor.

5. The electric machine tool (1) according to claim 4, characterized in that
   the speed sensor is designed as Hall sensor, reed sensor, optical sensor and/or capacitive proximity sensor.

6. The electric machine tool (1) according to claim 1, characterized in that
   the control device (10) comprises a computer program product with program code means of the safety class B which is executed within the motor control unit (2), a circuit breaker (13) within a power path to the electric motor (M) and/or an electric fuse.

7. The electric machine tool (1) according to claim 1, characterized in that,
   for operating the electric motor (M), the motor control unit (2) comprises a pulse width modulation unit (4) for generating a pulse width modulation signal (B) for a power control of the electric motor (M).

8. The electric machine tool (1) according to claim 1, characterized in that,
   for operating the electric motor (M), the motor control unit (2) is connected to the electric motor (M) by means of a power amplifier (5).

9. A method for operating an electric machine tool (1) with an electric motor (M), according to which an input interface (3) for entering a target specification (A) of an operating mode of the electric motor (M) is used in a motor control unit (2) which operates the electric motor (M), wherein a motor sensor device (8) detects the operating mode of the electric motor (M),
   characterized in that
   a slave control unit (9), which is independent from the motor control unit (2), monitors the operating mode of the electric motor (M) by means of the motor sensor device (8) and compares it to the target specification (A) entered by the input interface (3), wherein the slave control unit (9) deactivates the electric motor (M) in case of a defined deviation of the operating mode from the target specification (A), or influences it to reach the target specification (A).

10. The method according to claim 9, characterized in that
    discreet operating modes of the electric motor (M), particularly an activated/deactivated operating mode of the electric motor (M) and/or continuous operating modes, particularly a speed (N) or an electric power consumption of the electric motor (M), are used as target specification (A).

11. A method according to claim 10, characterized in that,
    in case of a target specification (A) regarding a deactivated operating mode of the electric motor (M), a defined deviation of the operating mode from the target specification (A) is present, when the electric motor (M) is not deactivated within a defined interval after the input of the target specification (A) and/or when no defined drop of the speed (N) and/or no defined drop of the power consumption of the electric motor (M) occurs within the defined interval.

12. A method according to claim 9, characterized in that,
    after a deactivation of the electric motor (M) due to a defined deviation of the operating mode from the target specification (A), a restart of the electric motor (M) is prevented.

13. A computer program product with program code means for executing the method according to claim 9, when the program is executed in a control unit (2, 9) of an electric machine tool (1).

* * * * *